US012626009B1

(12) United States Patent
Raj et al.

(10) Patent No.: US 12,626,009 B1
(45) Date of Patent: May 12, 2026

(54) IN-TRANSIT EMAIL REVIEW AND DATA COLLECTION

(71) Applicant: Gen Digital Inc., Tempe, AZ (US)

(72) Inventors: Vinith Raj, Stevenson Ranch, CA (US); Sriharsha Angara, Fremont, CA (US)

(73) Assignee: GEN DIGITAL INC., Tempe, AZ (US)

( * ) Notice: Subject to any disclaimer, the term of this patent is extended or adjusted under 35 U.S.C. 154(b) by 122 days.

(21) Appl. No.: 18/402,148

(22) Filed: Jan. 2, 2024

(51) Int. Cl.
| | |
|---|---|
| *G06F 21/62* | (2013.01) |
| *H04L 9/40* | (2022.01) |
| *H04L 51/212* | (2022.01) |

(52) U.S. Cl.
CPC ........ *G06F 21/6245* (2013.01); *H04L 51/212* (2022.05); *H04L 63/04* (2013.01)

(58) Field of Classification Search
CPC .... G06F 21/6245; H04L 51/212; H04L 63/04
See application file for complete search history.

(56) References Cited

U.S. PATENT DOCUMENTS

| | | | | |
|---|---|---|---|---|
| 10,764,434 | B1* | 9/2020 | Yoskowitz | H04L 61/45 |
| 2011/0264781 | A1* | 10/2011 | Moser | H04L 61/4523 |
| | | | | 709/223 |
| 2013/0318199 | A1* | 11/2013 | Le Jouan | H04L 67/53 |
| | | | | 709/217 |
| 2017/0124038 | A1* | 5/2017 | Upadhyay | G06F 40/166 |
| 2017/0244747 | A1* | 8/2017 | Moreau-Cook | H04L 51/212 |

* cited by examiner

*Primary Examiner* — Christopher B Robinson
*Assistant Examiner* — Tania M Pena-Santana
(74) *Attorney, Agent, or Firm* — MASCHOFF BRENNAN

(57) ABSTRACT

Systems and methods for in-transit email review and data collection. In one embodiment, a method may include receiving a plurality of original emails at an alias email address. The alias email address may be associated with a user. Once a plurality of original emails are received at the alias email address, the method may include analyzing the plurality of original emails to identify relevant data contained within the plurality of original emails, and storing a copy of the identified relevant data in a database that is accessible by the user.

18 Claims, 4 Drawing Sheets

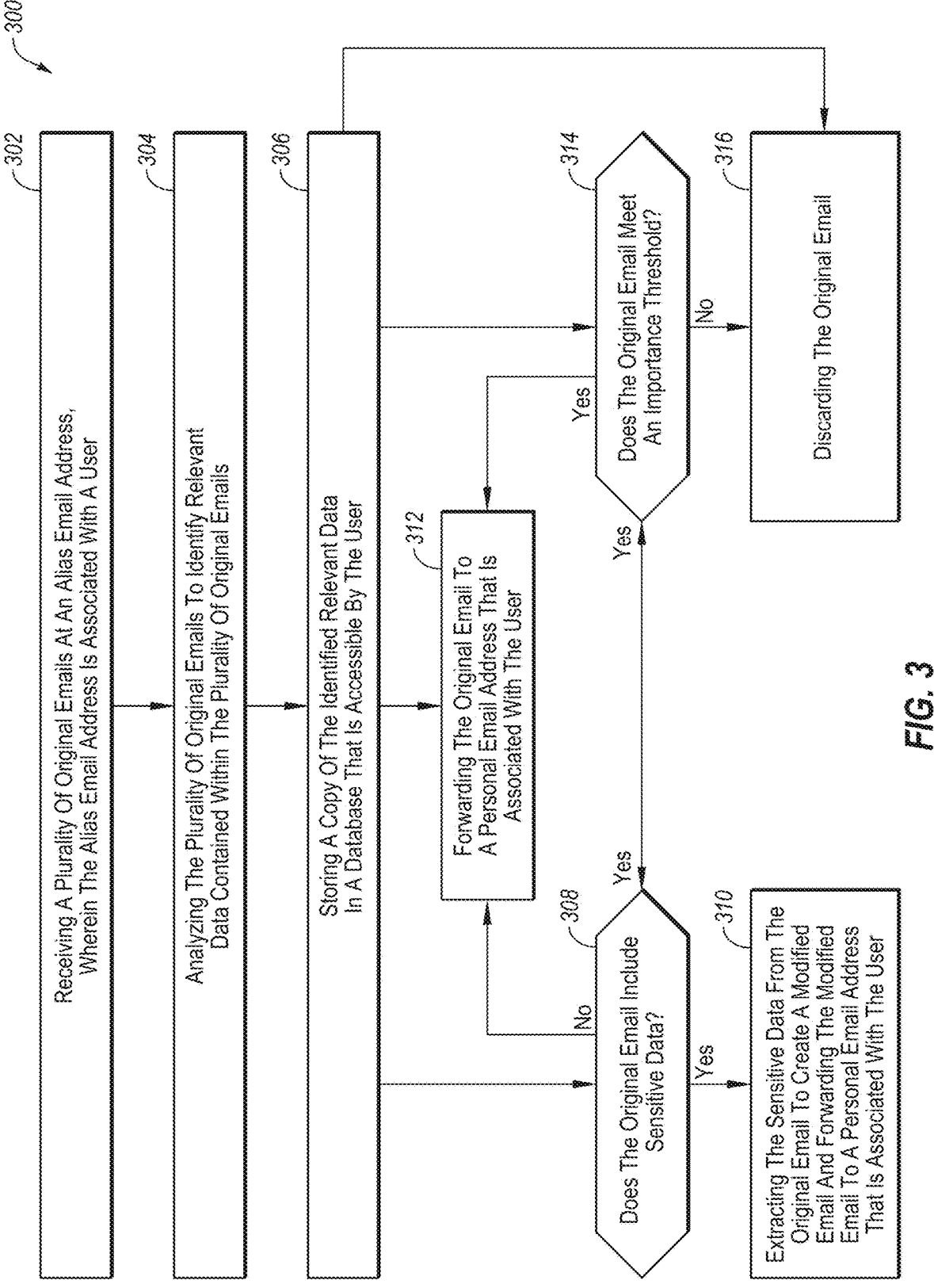

*300*

*302*
Receiving A Plurality Of Original Emails At An Alias Email Address, Wherein The Alias Email Address Is Associated With A User

*304*
Analyzing The Plurality Of Original Emails To Identify Relevant Data Contained Within The Plurality Of Original Emails

*306*
Storing A Copy Of The Identified Relevant Data In A Database That Is Accessible By The User

*312*
Forwarding The Original Email To A Personal Email Address That Is Associated With The User

*314*
Does The Original Email Meet An Importance Threshold?

Yes

No

*316*
Discarding The Original Email

*308*
Does The Original Email Include Sensitive Data?

No

Yes

Yes

*310*
Extracting The Sensitive Data From The Original Email To Create A Modified Email And Forwarding The Modified Email To A Personal Email Address That Is Associated With The User

*FIG. 3*

IN-TRANSIT EMAIL REVIEW AND DATA COLLECTION

BACKGROUND

An average person may receive more than 100 emails every day. While many of these emails are unwanted junk that is sent out in bulk to an indiscriminate recipient list, some emails are valuable, containing important information and calls to action. However, the sheer volume of emails received in an average day makes it difficult for users to identify, prioritize, and focus on the important messages. This inevitably leads to important information being lost and calls to action being missed.

To avoid missing messages containing important information and calls to action, some users are constantly reviewing received emails and checking email accounts for new emails. However, with so many incoming emails, this task can be time consuming and overwhelming, which may lead to a significant decrease in daily productivity.

In addition, emails are commonly used to spread malware, perpetrate scams, and perform other cyberattacks. If significant care is not exercised, users may inadvertently interact with malicious actors and divulge personal information. The receipt of excessive emails increases the risk of falling victim to these threats, as it is often impossible to exercise the required level of care when interacting with a large volume of emails.

Thus, improved methods and systems for identifying important information and calls to action within emails are needed.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for in-transit email review and data collection may be performed, at least in part, by a computing device comprising one or more processors. The method may include receiving one or more original emails at an alias email address. The alias email address may be associated with a user. Once original emails are received at the alias email address, the method may include analyzing the original emails to identify relevant data contained within the original emails, and storing a copy of the identified relevant data in a database that is accessible by the user.

In some embodiments, the database may include a privacy preserving aspect such that the data stored in the database can only be accessed by the user, such as a private vault. For example, the private vault may be encrypted using a key provided only to the user.

In some embodiments, the relevant data may include information that falls within one or more categories specified by the user. In these embodiments, the one or more categories may include marketing and sales information, contact information, product information, travel information, entertainment data, login credentials, or sensitive data.

In some embodiments, the method may further include, for each original email that includes relevant data, determining whether the relevant data includes sensitive data. In response to a determination that the relevant data of a first original email includes sensitive data, the method may also include extracting the sensitive data from the first original email to create a modified email and forwarding the modified email to a personal email address that is associated with the user. In response to a determination that the relevant data of a second original email lacks sensitive data, the method may further include forwarding the second original email to the personal email address that is associated with the user.

In some embodiments, the method may further include, determining, for each original email, whether an importance threshold is met. In these embodiments, in response to a determination that a first original email does not exceeds the importance threshold, the method may include discarding the first email without forwarding the original email to a personal email address that is associated with the user. Alternatively, in response to a determination that a second original email exceeds the importance threshold, the method may include forwarding the second original email to the personal email address that is associated with the user.

In some embodiments, the method may further include generating a summary email that contains a summary of the relevant data stored in the database and sending the summary email to a personal email address that is associated with the user.

In some embodiments, one or more non-transitory computer-readable media may comprise one or more computer-readable instructions that, when executed by one or more processors of a computing device, cause the computing device to perform a method for in-transit email review and data collection.

In some embodiments, a computing device comprising one or more processors and one or more non-transitory computer-readable media comprising one or more computer-readable instructions that, when executed by the one or more processors, may cause the computing device to perform a method for in-transit email review and data collection.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which:

FIG. 3 is a flowchart of an example method 300 for in-transit email review and data collection.

DETAILED DESCRIPTION

Embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1:
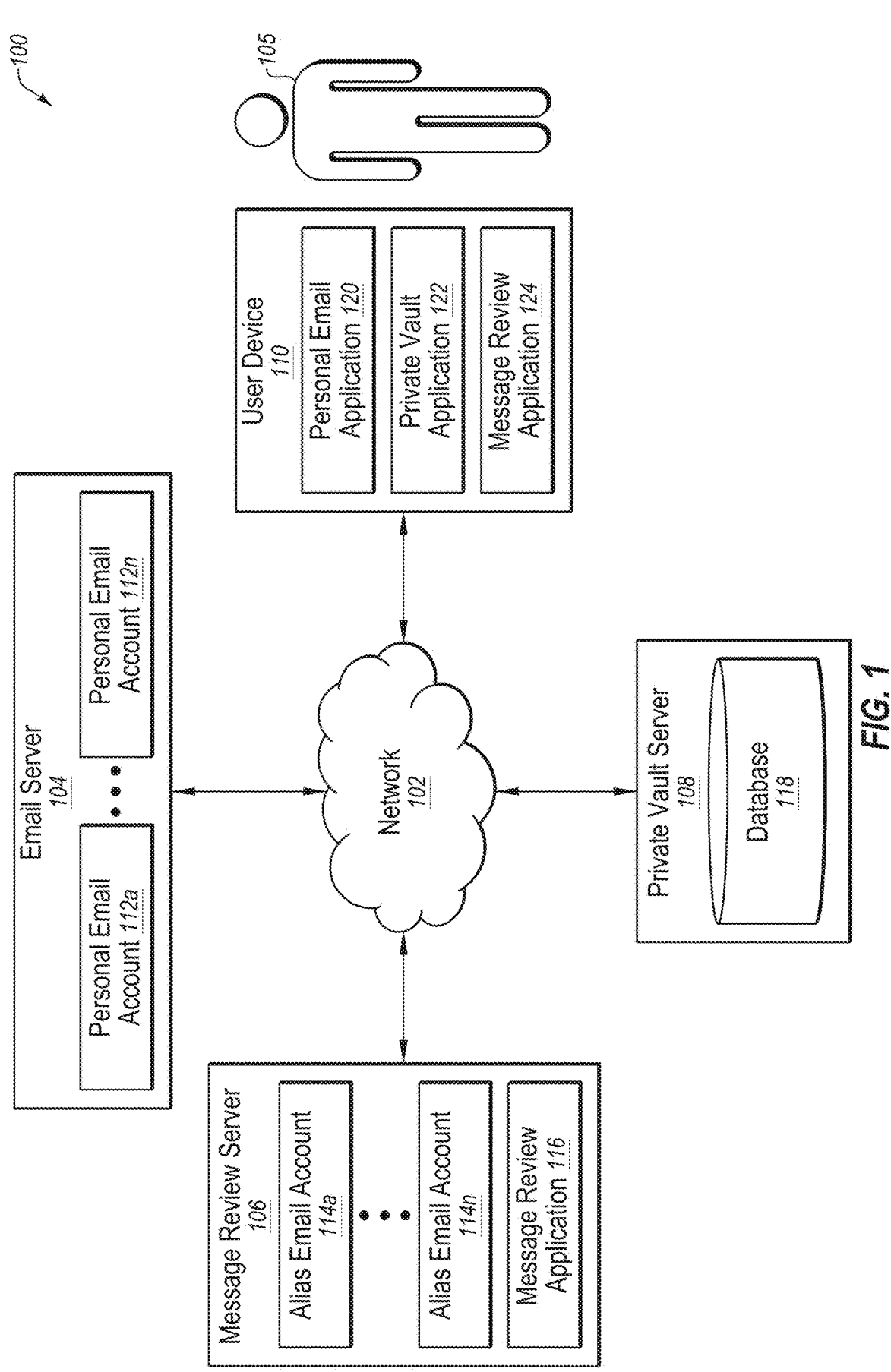
FIG. 1 illustrates an example system configured for in-transit email review and data collection.

FIG. 1 illustrates an example system 100 configured for in-transit email review and data collection. The system 100 includes a network 102, an email server 104, a message review server 106, a private vault server 108, a user device 110, and a user 105 who is associated with the user device 110.

In some embodiments, the network 102 may be configured to communicatively couple the email server 104, the message review server 106, the private vault server 108, and the user device 110. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 4:
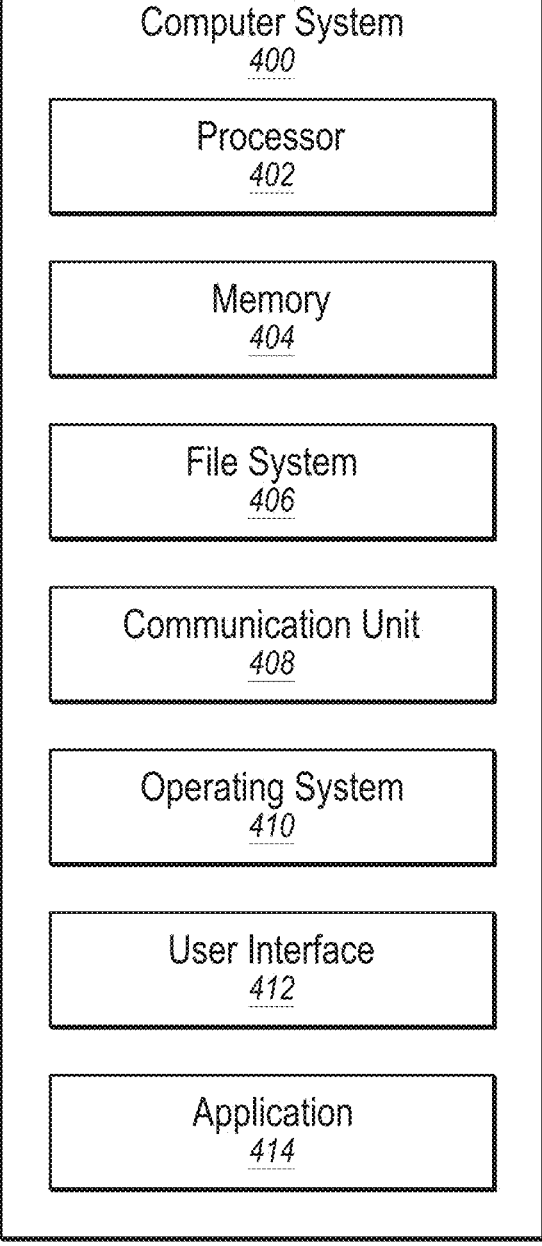
FIG. 4 illustrates an example computer system 400 that may be used for in-transit email review and data collection.

The email server 104 may be any computer system capable of communicating over the network 102 and providing access to email services, examples of which are disclosed herein in connection with the computer system 400 of FIG. 4. The email server 104 includes personal email accounts 112a-112n. Personal email accounts, as used herein, may be any email accounts that be accessed by authorized individuals to send, receive, and review emails. These email accounts 112a-112n may be associated with individual users, such as the user 105. For example, one or more of the email accounts 112a-112n may be associated with the user 105 if the user 105 created the email account(s) or has required log in credentials to access the email account(s). In one embodiment, the email accounts 112a-112n may be Gmail® accounts and the email server 104 may be a Google® server.

The message review server 106 may be any computer system capable of communicating over the network 102, examples of which are disclosed herein in connection with the computer system 400 of FIG. 4. The message review server 106 includes alias email accounts 114a-114n which, like the personal email accounts 112a-112n of the email server 104, may be associated with individual users, such as the user 105. For example, one or more of the alias email accounts 114a-114n may be associated with the user 105 if the user 105 created the alias email account(s). However, unlike the personal email accounts 112a-112n, users may be unable to access emails received at the alias email accounts 114a-114n or create emails to send from these accounts. Instead, these alias email accounts 114a-114n may be used to perform content review and data collection services while emails are in-transit from an originating location to another location, such as one of email accounts 112a-112n.

To perform this content review and data collection, the message review server 106 includes a message review application 116 that is configured to review and analyze the content of emails, including any attachments, that are received at the alias email accounts 114a-114n. The message review application 116 may be configured to identify relevant data contained within any of the emails received at the alias email accounts 114a-114n. This relevant data may include information within any number of different categories.

For example, relevant data may include marketing and sales information, such as coupons, sales information, discount codes, product releases, receipts, etc. Relevant data may include contact information, such as phone numbers, physical addresses, email addresses, etc. Relevant data may include product information, such as activation codes, authentication credentials, etc. Relevant data may include travel information, such as booking references, passenger name record (PNR) numbers, directions, addresses, access codes, etc. Relevant data may include entertainment data, such as quick-response (QR) codes or other access credentials. Relevant data may include login credentials, such as usernames and passwords. Relevant data may include sensitive data such as personally identifiable information (PII), login information (such as usernames and passwords), birth dates, government numbers (such as social security numbers and driver's license/passport numbers), financial information, medical/health information, tax information, educational information, etc.

Categories or specific types of relevant data may be identified by a user associated with an alias email account. For example, when a user sets up an alias email account, he or she may identify the type of relevant data to be identified within the emails received at the alias email account.

Once the message review application 116 has analyzed emails received at the alias email accounts 114a-114n for relevant data, any relevant data is that has been discovered may be copied from the emails and stored in a database that is accessible by the individual associated with the alias email account from which the relevant data was found. In one embodiment, the relevant data may be saved in a local database within the message review server 106. In another embodiment, the relevant data may be sent to an external server, such as the private vault server 108, for storage. In another embodiment, the relevant data may be sent to and stored within a device that is associated with the user, such as the user device 110.

While the system 100 includes the private vault server 108 for storing relevant data, data can be stored in a number of different locations, as provided above. The private vault server 108 may be any computer system capable of receiving data, storing data, and making stored data available over the network 102, examples of which are disclosed herein in connection with the computer system 400 of FIG. 4. The private vault server 108 includes a database 118. The database 118 may include a privacy preserving aspect such that the data stored in the database 118 can only be accessed by the user. For example, the database 118 may be encrypted using a key provided only to the user. Data received and stored in the database 118, including relevant data from the message review server 106, may be associated with a specific user, such as the user 105, who has an account at the private vault server 108. By logging into a personal account at the private vault server 108, a user may gain access his or her data, which is stored in the database 118.

Once relevant data from an email sent to an alias email account 114a-114n (or an "original email") has been identified, copied, and saved to a storage location, the message review application 116 may forward the original email to an email account that is also associated with the user (such as one of the personal email accounts 112a-112n). Alternatively, the message review application 116 may discard the original email. Alternatively still, the message review application 116 may extract certain data from the original email to create a modified email, and forward the modified email to an email account that is also associated with the user (such as one of email accounts 112a-112n).

The user device 110 may be any computer system capable of communicating over the network 102, examples of which are disclosed herein in connection with the computer system 400 of FIG. 4. The user device 110 includes a personal email application 120, which may provide the user 105 with access to one or more of email accounts 112a-112n. For example, the user 105 may have a Gmail® account and the personal email application 120 may be a Gmail® application that allows the user 105 to access to his or her account. The personal email application 120 may enable the user 105 to receive, send, and review emails.

The user device 110 also includes a private vault application 122. Through the private vault application 122, the user 105 may access data stored in the private vault server 108. For example, the user 105 may have an account with the private vault server 108 and the private vault application 122 may provide the user 105 with access to data stored in the database 118 of the private vault server 108.

The user device 110 also includes a message review application 124. Through the message review application 124, the user 105 may create an alias email account (such as one of alias email accounts 114*a*-114*n*) and obtain an alias email address with the message review server 106. The user 105 may provide instructions to the message review server 106 including instructions for the type of relevant data to be identified and copied to the user's private vault account from emails received at the alias email address. In some embodiments, the user 105 may also provide instructions to the message review server 106 regarding what actions to take with the emails once relevant data has been identified and copied. For example, once relevant data has been identified and copied to the user's private vault account, the message review server 106 may forward the email to another personal email address that is associated with the user. Alternatively, the message review server 106 may discard the email. Alternatively still, the message review server 106 may extract certain data from the email to create a modified email, and forward the modified email to another personal email address that is associated with the user. Alternatively or in addition, the message review server may generate an email contains a summary of the relevant data copied from the original emails over a given period of time or whenever relevant data is copied to the a database. This summary email may be sent to the personal email address so that the user associated with the personal email address knows what type of data has been copied and stored in the database.

In one specific embodiment, the user may set up an alias email address with the message review server 106 and provide instructions to identify and copy to a specified private vault account all marketing and sales information (including coupons, sales information, discount codes, product releases, receipts, etc.) and to then discard the received emails.

Regardless of what action the message review server 106 takes with the emails, identifying and copying relevant data from received emails creates significant efficiencies for users that receive a large volume of emails. In particular, users are able to avoid the steps of opening individual emails (including attachments) and reviewing each email separately for relevant data. Instead, the user can simply log into a vault account, where all relevant data has already been collected from emails received at the alias email account. This not only eliminates steps that the user would otherwise need to take to obtain the relevant data, it also avoids the possibility that the user may miss some relevant data from an email or miss an email altogether.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
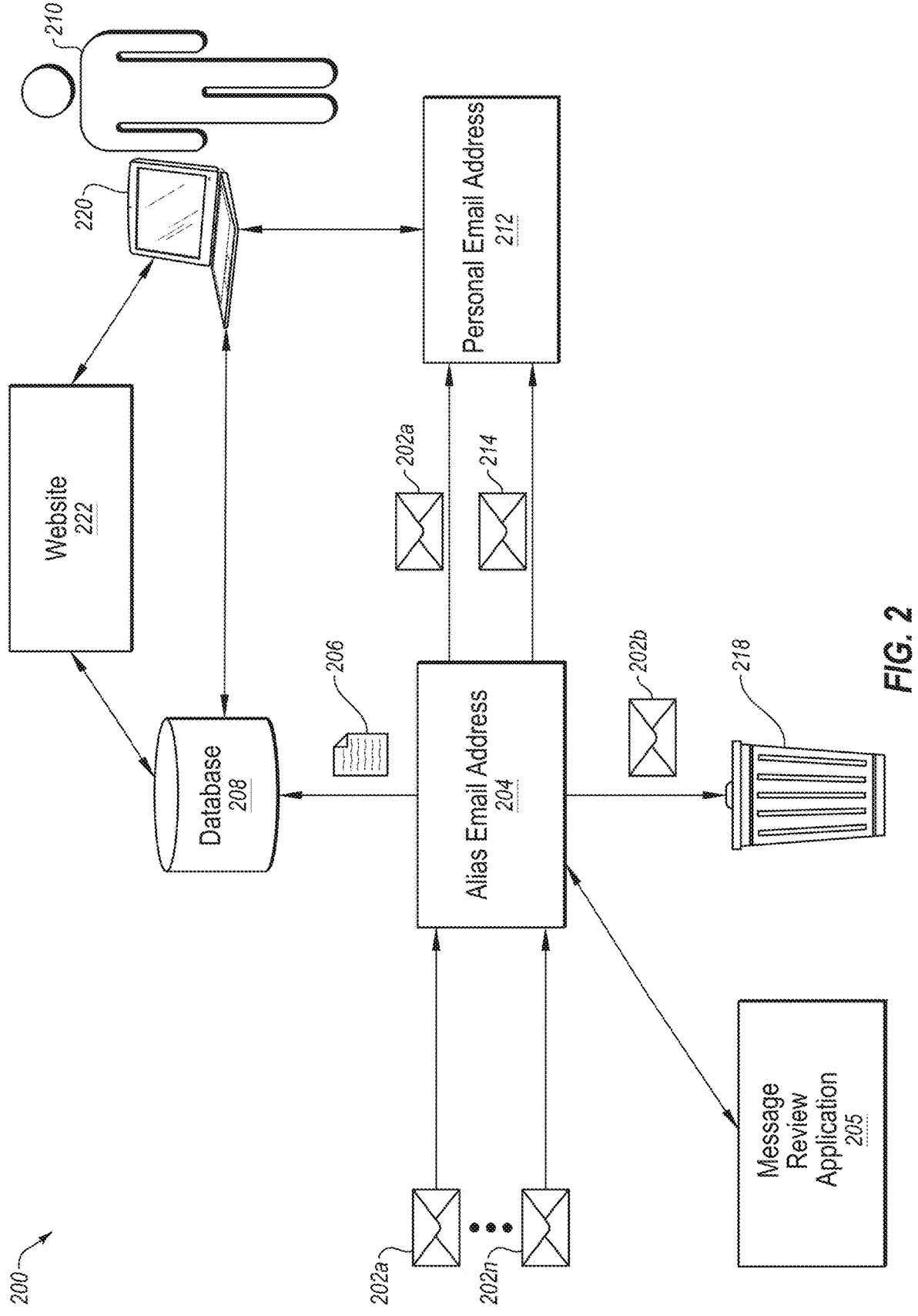
FIG. 2 illustrates a process flow diagram 200 configured for in-transit email review and data collection.

FIG. 2 illustrates a process flow diagram 200 configured for in-transit email review and data collection. In the flow diagram 200, a user 210 may have created an alias email account and a personal email account. An alias email address

204, such as tom@aliasemail.com may be associated with the user's alias email account. Similarly, a personal email address 212, such as tom@personalemail.com may be associated with the user's personal email account. After creating these accounts and receiving the associated email addresses, the user 210 may distribute the alias email address 204 to a variety of individuals and/or organizations. For example, the user 210 may use the alias email address 204 anytime an email address is required or requested. For example, the user 210 may use the alias email address 204 when signing up for a loyalty program at a retail store, as a contact email for a product registration or other notifications.

In a first step of the process flow diagram 200, original emails 202*a*-202*n* are received at the alias email address 204. Once at the alias email address, a message review application 205 may analyze the content of the emails and any attachments for relevant data 206. In one embodiment, the user 210 may specify the type of relevant data that he or she wants to be identified. For example, if the user 210 provided the alias email address when he or she signed up for a loyalty program at a retail store, the user 210 may specify that the relevant data to include marketing and sales information, such as coupons, sales information, discount codes, product releases, receipts, etc.

Once the message review application 205 has analyzed the original messages 202*a*-202*n*, it may copy the relevant data 206 that it discovered in these messages and store it in a database, such as the database 208, to which the user 210 has access. In some embodiments, the database 208 may be accessible through a private vault server. The user 210 may obtain access to the database 208 through an account with the private vault server. In other embodiments, the database 208 may be part of a personal computing device, such as the personal computer 220, that is owned or associated with the user 210. Regardless of where the relevant data is stored, the user 210 may have access to the relevant data 206 through a computing device, such as the personal computer 220.

Once the message review application 205 has copied the relevant data 206 and stored it in the database 208, the message review application 205 may forward an original email, such as the original email 202*a*, to the personal email address 212. Alternatively, the message review application 205 may perform a relevance analysis on the original emails 202*a*-202*n* to determine whether the original emails 202*a*-202*n* meet or exceed an importance threshold. If an email does not meet or exceed an importance threshold, such as the original email 202*b*, it may be discarded to a recycle bin 218 without being forwarded on to any other email address. A determination regarding whether an email meets or exceeds an importance threshold may be based on the sender of the email or the content of the email or attachments. For example, during a set up procedure for the alias email address 204, the user 210 may specify individuals or entities that do, or do not, meeting the importance threshold. The user 210 may also provide a list of key words or phrases that may be used by the message review application 205 to determine whether to discard the email.

In another embodiment, a determination regarding whether an email meets or exceeds an importance threshold may be based on information from a reputation database, which assigns individuals and/or organizations a reputation score. Emails from individuals and/or organizations that have an assigned reputation score that falls below a threshold may be discarded.

Alternatively still, the message review application 205 may determine whether the original emails 202*a*-202*n* include any sensitive data. This sensitive data may include, for example, personally identifiable information (PII), login information (such as usernames and passwords), birth dates, government numbers (such as social security numbers and driver's license/passport numbers), financial information, medical/health information, tax information, educational information, etc. In some embodiments, the user 210 may define what qualifies as sensitive data. In some embodiments, the user 210 may identify his or her sensitive data through a hash or another privacy protecting mechanism so that the user 210 is not identifying the actual sensitive data to the message review application 205. If the message review application 205 identifies any sensitive data in any of the original emails 202a-202n, it may extract the sensitive data from the original email to create a modified email 214. The message review application 205 may then forward the modified email 214 to the personal email address 212.

Once relevant data 206 has been saved in the database 208, the user 210 may access it through the personal computer 220. The personal computer may include a browser that enables the user 210 to visit websites (such as the website 222) over a network (such as the Internet). In some embodiments, the personal computer 220 may include a browser extension that correlates information saved in the database 208 with the website 222. For example, if the database 208 includes coupons for a retail establishment, it may notify the user 210 of these coupons when the user visits a website associated with the retail establishment.

The actions of message review application 205 dramatically increase the efficiency with which the user 210 may identify relevant data. Instead of needing to review emails individually, the user 210 can simply access all of this information from a single repository, the database 208. In addition, discarding emails that do not meet or exceed an importance threshold significantly reduces the amount of junk email or spam that the user 210 receives. This junk email can not only consume time, it can also make the user 210 more susceptible to falling victim to scams and other malicious emails. However, the message review application 205 also reduces the chances that the user 210 may inadvertently share personal information with a malicious actor by extracting sensitive information from emails. Removing this information from original emails to create modified emails eliminates the risk of inadvertent disclosure, even if the modified emails are forwarded to a malicious actor.

While the process flow diagram 200 illustrates only a single alias email address 204, the user 210 may have any number of different alias email addresses. For example, in one embodiment, the user 210 may have different alias email addresses for different categories of emails or emails from specific entities. For example, the user 210 may have a first alias email address that he or she provides to marketing and sales entities. The user 210 may have a second alias email address that he or she provides to travel entities. The user 210 may have a third alias email address that he or she provides to entertainment entities, and so on. By having different alias email addresses, relevant data from these emails may not only be copied and saved to a database, but the relevant data may be categorized based on the alias email address that received the email. For example, relevant data copied from the first email address may include coupons, sales information, discount codes, product releases, receipts, etc. Relevant data copied from the second email address may include booking references, passenger name record (PNR) numbers, directions, addresses, access codes, etc. Relevant data copied from the third email address may include QR codes or other access credentials.

FIG. 3 is a flowchart of an example method 300 for in-transit email review and data collection. The method 300 may be performed, in some embodiments, by a device or system, such as by the message review server 106 in FIG. 1 or the alias email address 204 and the message review application 205 in FIG. 2. In these and other embodiments, the method 300 may be performed by one or more processors based on one or more computer-readable instructions stored on one or more non-transitory computer-readable media.

The method 300 may include, at action 302, receiving a plurality of original emails at an alias email address, wherein the alias email address is associated with a user. For example, the user may have received the alias email address after creating an account with a message review server.

The method 300 may include, at action 304, analyzing the plurality of original emails to identify relevant data contained within the plurality of original emails. This relevant data may include information within any number of different categories. For example, relevant data may include marketing and sales information, such as coupons, sales information, discount codes, product releases, receipts, etc. Relevant data may include contact information, such as phone numbers, physical addresses, email addresses, etc. Relevant data may include product information, such as activation codes, authentication credentials, etc. Relevant data may include travel information, such as booking references, passenger name record (PNR) numbers, directions, addresses, access codes, etc. Relevant data may include entertainment data, such as quick-response (QR) codes or other access credentials. Relevant data may include login credentials, such as usernames and passwords. Relevant data may include sensitive data such as personally identifiable information (PII), login information (such as usernames and passwords), birth dates, government numbers (such as social security numbers and driver's license/passport numbers), financial information, medical/health information, tax information, educational information, etc. In some embodiments, this relevant data may be defined by the user.

The method 300 may include, at action 306, storing a copy of the identified relevant data in a database that is accessible by the user. This database may be a private vault that is accessible to a user with the proper authenticating credentials to gain access to this database. Alternatively, the database may be memory that is local to a device associated with the user.

Once relevant data has been copied and saved in a database, the method 300 may include, at action 308, determining whether any of the original emails include sensitive data. If it is determined that an original email includes sensitive data, at action 310, this data may be extracted from the original email to create a modified email. This modified email may then be forwarded to a personal email address that is associated with the user. Alternatively, if it is determined that the original email does not include sensitive data, at action 312, the original email may be forwarded to a personal email address that is associated with the user.

Alternatively, the method 300 may include, at action 314, determining whether the original email meets an importance threshold. If it is determined that the original email meets this importance threshold, at action 312, the original email may be forwarded to a personal email address that is associated with the user. However, if it is determined that the original email does not meet the importance threshold, at action 316, the original email may be discarded. In some embodiments, both of the inquiries at actions 308 and 314 may be performed (in any order). For example, it may be first determined whether the original email meets an importance threshold in the action 314. Then, for the emails that meet the threshold, it may be determined whether the relevant data includes any sensitive data in the action 308.

Alternatively, once relevant data has been copied and saved in a database, the original email may be directly discarded in the action 316 or forwarded to another email address in the action 312 without any further inquiry.

The method 300 may thus be employed, in some embodiments, to identify and copy relevant data from original emails to a database to avoid the numerous steps that would otherwise be required. These steps include a user actually opening each email individually and any associated attachments to identify relevant data. Not only does this consume time and computing resources, it also increases the likelihood that some relevant data will be missed.

Although the actions of the method 300 are illustrated in FIG. 3 as discrete actions, various actions may be divided into additional actions, combined into fewer actions, reordered, expanded, or eliminated, depending on the desired implementation. For example, in some embodiments, the inquiries performed in the actions 308 and 314 may be avoided and emails may simply be forwarded or discarded.

Specifically, in one embodiment, the method 300 may include another step in which an additional email may be generated that contains a summary of the relevant data copied from the original emails. This summary email may be sent to the personal email address so that the user associated with the personal email address knows what type of data has been copied and stored to the database.

Further, it is understood that the method 300 may improve the functioning of a computer system itself. For example, the functioning of a personal computer on which a user accesses an email inbox may be improved as the user may simply access a database to identify all relevant data contained in received emails. Alternatively, the user would need to open each email individually, which would consume resources of the personal computer, which would result in the slowing of other operations and processes being performed on the computer.

FIG. 4 illustrates an example computer system 400 that may be used for in-transit email review and data collection. In some embodiments, the computer system 400 may be part of any of the systems or devices described in this disclosure. For example, the computer system 400 may be part of any of the email server 104, the message review server 106, the private vault server 108, and the user device 110 of FIG. 1 or the personal computer 220 of FIG. 2.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more of the actions of the methods disclosed herein.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more of the actions of the methods disclosed herein. These computer-executable instructions may be included, for example, in the operating system 410, in one or more applications, such as the message review applications 116, 124, and 205, the personal email application 120, or the private vault application 122, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more of the actions of the methods disclosed herein. In some embodiments, the application 414 may be part of the operating system 410 or may be part of an application of the computer system 400, or may be some combination thereof. In some embodiments, the application 414 may function as any one of the message review applications 116, 124, and 205, the personal email application 120, and the private vault application 122.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for email review and data collection, at least a portion of the method being performed by a computing device comprising one or more processors, the method comprising:

receiving one or more original emails at an alias email address, wherein the alias email address is associated with a user;

analyzing the content of the one or more original emails to identify relevant data contained within the content of the one or more original emails;

storing a copy of the identified relevant data in a database that is accessible by the user;

for each original email in the one or more original emails that includes relevant data, determining whether the relevant data includes sensitive data;

in response to a determination that the relevant data of a first original email in the one or more original emails includes sensitive data, extracting the sensitive data from the first original email to create a modified email; and forwarding the modified email to a personal email address that is associated with the user.

2. The method of claim 1, wherein the database is a private vault.

3. The method of claim 1, wherein the relevant data includes information that falls within one or more categories specified by the user.

4. The method of claim 1, further comprising:

in response to a determination that the relevant data of a second original email in the one or more original emails lacks sensitive data, forwarding the second original email to the personal email address that is associated with the user.

5. The method of claim 1, further comprising:

determining, for each original email in the one or more original emails, whether an importance threshold is met;

in response to a determination that a second original email in the one or more original emails does not exceed the importance threshold, discarding the second original email without forwarding the second original email to the personal email address that is associated with the user; and in response to a determination that a third original email in the one or more original emails exceeds the importance threshold, forwarding the third original email to the personal email address that is associated with the user.

6. The method of claim 1, further comprising:

generating a summary email that contains a summary of the relevant data stored in the database; and sending the summary email to the personal email address that is associated with the user.

7. One or more non-transitory computer-readable media comprising one or more computer-readable instructions that, when executed by one or more processors of a computing device, cause the computing device to perform a method for email review and data collection, the method comprising:

receiving one or more original emails at an alias email address, wherein the alias email address is associated with a user;

analyzing the content of the one or more original emails to identify relevant data contained within the content of the one or more original emails;

storing a copy of the identified relevant data in a database that is accessible by the user;

for each original email that includes relevant data in the one or more original emails, determining whether the relevant data includes sensitive data;

in response to a determination that the relevant data of a first original email in the one or more original emails includes sensitive data, extracting the sensitive data from the first original email to create a modified email; and forwarding the modified email to a personal email address that is associated with the user.

8. The one or more non-transitory computer-readable media of claim 7, wherein the database is a private vault.

9. The one or more non-transitory computer-readable media of claim 7, wherein the relevant data includes information that falls within one or more categories specified by the user.

10. The one or more non-transitory computer-readable media of claim 7, further comprising:

in response to a determination that the relevant data of a second original email in the one or more original emails lacks sensitive data, forwarding the second original email to the personal email address that is associated with the user.

11. The one or more non-transitory computer-readable media of claim 7, further comprising:

determining, for each original email in the one or more original emails, whether an importance threshold is met;

in response to a determination that a second original email in the one or more original emails does not exceed the importance threshold, discarding the second original email without forwarding the second original email to the personal email address that is associated with the user; and in response to a determination that a third original email in the one or more original emails exceeds the importance threshold, forwarding the third original email to the personal email address that is associated with the user.

12. The one or more non-transitory computer-readable media of claim 7, further comprising:

generating a summary email that contains a summary of the relevant data stored in the database; and sending the summary email to the personal email address that is associated with the user.

13. A computing device comprising:

one or more processors; and one or more non-transitory computer-readable media comprising one or more computer-readable instructions that, when executed by the one or more processors, cause the computing device to perform a method for email review and data collection, the method comprising:

receiving one or more original emails at an alias email address, wherein the alias email address is associated with a user;

analyzing the content of the one or more original emails to identify relevant data contained within the content of the one or more original emails;

storing a copy of the identified relevant data in a database that is accessible by the user;

for each original email that includes relevant data in the one or more original emails, determining whether the relevant data includes sensitive data;

in response to a determination that the relevant data of a first original email in the one or more original emails includes sensitive data, extracting the sensitive data from the first original email to create a modified email; and forwarding the modified email to a personal email address that is associated with the user.

14. The computing device of claim 13, wherein the relevant data includes information that falls within one or more categories specified by the user.

15. The computing device of claim 14, wherein the one or more categories include marketing and sales information, contact information, product information, travel information, entertainment data, login credentials, or sensitive data.

16. The computing device of claim 13, the method further comprising:

in response to a determination that the relevant data of a second original email in the one or more original emails lacks sensitive data, forwarding the second original email to the personal email address that is associated with the user.

17. The computing device of claim 13, the method further comprising:

determining, for each original email in the one or more original emails, whether an importance threshold is met;

in response to a determination that a second original email in the one or more original emails does not exceed the importance threshold, discarding the second original email without forwarding the second original email to the personal email address that is associated with the user; and in response to a determination that a third original email in the one or more original emails exceeds the importance threshold, forwarding the third original email to the personal email address that is associated with the user.

18. The computing device of claim 13, the method further comprising:

generating a summary email that contains a summary of the relevant data stored in the database; and sending the summary email to the personal email address that is associated with the user.

\* \* \* \* \*